United States Patent Office 2,888,355
Patented May 26, 1959

2,888,355
BORON NITRIDE-METAL CARBIDE BODIES AND THE MANUFACTURE THEREOF

Kenneth M. Taylor, Lewiston, N.Y., assignor to The Carborundum Company, Niagara Falls, N.Y., a corporation of Delaware No Drawing. Application January 3, 1955
Serial No. 479,671

8 Claims. (Cl. 106—43)

This invention relates to shaped bodies or articles of manufacture consisting essentially of refractory metal carbide and boron nitride, and to compositions and methods for making the same.

There is a constant search for new compositions or bodies that possess unexpected combinations of properties essential to or desirable in specific fields of use. The bodies of the present invention possess certain combinations of properties and characteristics that render them of considerable value, and they offer outstanding possibilities in a number of fields of use. It is, therefore, to be understood that the refractory carbide-boron nitride bodies hereinafter more fully described are not to be considered as restricted to any particular field of use. However, their outstanding characteristics as refractory materials are particularly worthy of note and make them especially suitable for many refractory purposes. The present invention therefore will be described primarily in respect to using the herein described products for refractory purposes, although not intended to be limited thereto.

Above all a refractory body must possess refractoriness, that is, ability to stand up under exposure to high temperatures without undue chemical or physical change. Other desirable characteristics sought in a refractory body or shape include an ability to resist sudden changes in temperature without cracking or otherwise breaking down, a satisfactorily high mechanical strength at elevated temperatures as well as at room temperature, chemical inertness and resistance to various corrosive and erosive substances and conditions, a resistance to oxidation, and a density and hardness dependent upon the use to which the refractory body or shape is to be put.

In order to obtain a high degree of perfection in one or more of the above properties, it has usually been necessary to forego the benefit of maximum performance in respect to certain other desirable properties. Consequently, various refractory compositions exceptionally suited for one use frequently are entirely unsatisfactory for other purposes. There is, therefore, a continual need for refractory bodies of new compositions that will meet those demands of a special nature that require novel combinations of properties not to be found in compositions already available.

It is an object of the present invention to provide bonded bodies or shaped articles of manufacture of unusual and distinctive compositions and properties.

It is another object to provide refractory bodies or shapes having a particular combination of properties heretofore unavailable in refractory compositions.

It is another object to provide novel compositions of matter consisting essentially of refractory metal carbide material and boron nitride.

It is a further object to provide practical methods and compositions for making such articles.

The shapes or bodies of the present invention comprise boron nitride and refractory metal carbide, the boron nitride being present in major amounts by volume and the metal carbide being present in minor amounts by volume. The preferred compositions of the present invention comprise a discontinuous phase of refractory metal carbide bonded by a substantially continuous phase of boron nitride, the boron nitride making up at least 50% by volume of the composition, and usually 60% or more by volume. It is believed that in the present bodies a continuous phase interstitial matrix of boron nitride surrounds and strongly bonds the substantially uniformly distributed granules of metal carbide to form a dense, strong refractory body.

The raw mixes of the present invention comprise predominant amounts by volume of finely divided boron nitride intimately commingled with lesser amounts by volume of finely divided metal carbide.

The bodies of the present invention are produced by first preparing or selecting an intimately commingled finely divided raw mix of the above composition. This raw mix is then placed in a closed mold with a movable plunger and hot pressed by simultaneously subjecting the mold and contents to heat and pressure, the heat and pressure being maintained until the downward movement of the plunger ceases, indicating that maximum density has been obtained.

During hot pressing pressures of at least about 250 p.s.i. are employed, and usually 400 p.s.i. or more. While the exact pressure used is not highly critical, it has been found that the particular temperature employed is highly critical. A minimum temperature of about 1500° C. is required to give satisfactory hardness, strength and density to the bodies. Bodies pressed below this temperature are weak and porous, and are too friable for most purposes. Likewise, the maximum temperature employed is highly critical since at elevated temperatures most metal carbides react with boron nitride producing free carbon, metal boride and/or metal nitride. Bodies made at too high a temperature and containing substantial free carbon, metal boride and/or metal nitride are weak and soft. While the maximum permissible temperature varies somewhat depending upon the particular metal carbide employed, since the various metal carbides react with boron nitride at different temperatures, in general it has been found that a temperature of 2000° C. should not be exceeded. Preferably a temperature in the range of 1500° C. to 1800° C. is employed.

The boron nitride used in carrying out the present invention may be either a high or low purity boron nitride material available on the market. For example, it may be an impure boron nitride made in accordance with the process described in my co-pending United States patent application Serial No. 288,553, now Patent No. 2,789,886. This boron nitride material is made by nitriding a porous pelleted mixture of boric acid or boric oxide and tricalcium phosphate by heating it in ammonia gas at a temperature of around 900° C. After nitriding the resulting nitrided pellets are treated with dilute hydrochloric acid to dissolve the tricalcium phosphate and other extraneous materials. The undissolved boron nitride, after washing with water, is usually treated with hot 95% alcohol solution to further lower the content of extraneous materials. The material is then dried by allowing it to stand overnight at room temperature followed by heating for two hours at 300° C. A typical analysis of the boron nitride is as follows:

| | Percent |
|---|---|
| Boron | 41.45 |
| Nitrogen | 44.00 |
| Free boric acid (calculated as $H_3BO_3$) | .75 |
| Silica | .28 |
| Calcium | Trace |
| Phosphate ($PO_4$) | Trace |
| Material volatile at 110° C. | .26 |
| Extraneous matter, estimated to be combined oxygen | 13.26 |

Although this material contains no alcohol-soluble material, it is believed that it contains up to about 20% of an oxidic boron compound combined either chemically or physically so as to be insoluble in alcohol and water.

An example of a high-purity boron nitride material that may be used in the process of the present invention is the material made in accordance with the process described in my United States patent application Serial No. 413,968, now Patent No. 2,808,314. Boron nitride material is made in accordance with this patent application by first preparing a low-purity boron nitride material, such as the boron nitride material prepared in accordance with the process of my above-mentioned patent application Serial No. 288,553, and then heating the low-purity boron nitride material in an atmosphere of ammonia at a temperature ranging from about 1100 to 1500° C. A typical analysis of the resulting high-purity boron nitride material is as follows:

| | Percent |
|---|---|
| Boron | 43.3 |
| Nitrogen | 53.3 |
| Oxygen | 2.23 |
| Silica | 0.25 |
| Calcium | Nil |
| Iron and aluminum oxides | 0.16 |

The refractory metal carbide material employed in the process of the present invention may be any of the well-known refractory carbides of the metals of the 4th, 5th, or 6th Group of Mendeleeff's Periodic Table, preferably being selected from the group consisting of the carbides of titanium, tungsten, zirconium, chromium, molybdenum, columbium, hafnium, tantalum, thorium and mixtures thereof. Any preferably high-purity grade of these refractory metal carbides available on the market may be used in the raw mixes of the present invention. Consequently, methods for the preparation of these metal carbides need not be described for purposes of understanding or performing the practices of the present invention. It is to be noted that boron carbide is not a carbide of a metal of the 4th, 5th, or 6th Group of the Periodic Table, and the present invention does not contemplate the use thereof.

In order that the invention may be understood more clearly, the following examples are submitted as illustrative of compositions for and the manner of producing the bodies of the present invention.

*Example I*

Titanium carbide-boron nitride bodies containing more than 60% by volume of boron nitride were made as follows:

A high-purity grade of commercially available titanium carbide was ground in a ball mill for 16 hours, the resultant titanium carbide being about 10 microns and finer in particle diameter. After removal of the titanium carbide from the ball mill, it was treated with an acid solution consisting of one part of concentrated hydrochloric acid plus three parts of water. The acid-treated titanium carbide was then washed with water several times and dried in an oven at 110° C. A raw mix was then prepared by grinding together with a pestle and mortar equal weights of the thus treated titanium carbide and boron nitride. The boron nitride used in this raw mix was a high purity boron nitride material made in accordance with the process described in my aforementioned patent application Serial No. 413,968. By volume this raw mix consisted of 65.5% boron nitride and 34.5% titanium carbide.

The resulting raw mix was then placed in a cylindrical graphite mold having two movable graphite plungers. The assembled mold was placed in a graphite chamber of a high frequency furnace and heated to a maximum temperature of 1600° C., which temperature was maintained until no further motion of the mold plungers was evident. The furnace was then allowed to cool to room temperature. The furnace chamber was cylindrical, 12" long and 4" inside diameter, and was closed during the heating and cooling period except for an opening in the top about ½" in diameter thru which temperature observations were made.

The thus prepared boron nitride-titanium carbide body had a density of 1.84 grams per cubic centimeter. A sandblast penetration test on this body showed it to have a sandblast penetration hardness of .092 inch as compared to a sandblast penetration hardness of .010 inch for plate glass. X-ray analysis of this body showed it to consist essentially of titanium carbide and boron nitride, there being no indications of the presence of titanium boride or free carbon.

*Example II*

A boron nitride-tungsten carbide body containing more than 60% by volume of boron nitride was prepared as follows:

A commercially available high purity tungsten carbide material was milled, acid treated, washed and dried in accordance with the procedure set forth above in connection with the treatment of the titanium carbide of Example I.

A raw mix consisting of tungsten carbide and boron nitride was prepared by grinding together with a pestle and mortar three parts by weight of tungsten carbide with one part by weight of boron nitride, the boron nitride being of the same type used in Example I. By volume the raw mix consisted of 69.9% boron nitride and 30.1% tungsten carbide.

A cylindrical body was made from the above described raw mix by the procedure set forth in Example I. The resulting boron nitride-tungsten carbide body had a density of 4.5 grams per cubic centimeter and a sandblast penetration hardness of .064 inch. X-ray analysis indicated this body to consist essentially of boron nitride and tungsten carbide, there being no indication of the presence of any tungsten boride or free carbon.

While the above examples describe the practice of the present invention as it pertains to the manufacture of bodies consisting of boron nitride and tungsten or titanium carbide, substantially the same procedure can be used for the manufacture of bodies consisting of boron nitride and one or more other refractory metal carbides. The amount of metal carbide present in the bodies may range from almost zero percent, such as one or two percent, up to 50% by volume of the bodies. It has been found that unsatisfactory bodies are produced by hot pressing raw mixes consisting of boron nitride and more than about 50% by volume of metal carbide, because to consolidate such raw mixes by hot pressing excessively high temperatures are required. As pointed out above, when raw mixes consisting of metal carbide and boron nitride are exposed to excessively high temperatures a reaction takes place producing metal boride and free carbon. Bodies made using excessively high temperatures are generally weak and unsatisfactory. For example a raw mix consisting by weight of 80% titanium carbide and 20% boron nitride was consolidated employing a temperature of 2300° C. for fifteen minutes. X-ray analysis of the resulting body showed it to consist of titanium carbide, titanium boride, and graphite and/or boron nitride.

It is to be understood that the products of the present invention in its various modifications are not limited to any specific field or fields of use. The products can be made in any desired shape as well as provided in granular or aggregate form. They are, therefore, not only suited for many of the uses for which industrial refractories are required, including bricks, blocks, setter tile, muffles, kiln furniture, and special shapes for application in and around furnaces and other high-temperature equipment, but they are also well suited for many specialty high-temperature applications, such as jet engine combustion chambers, linings for exhaust nozzles, rocket combustion chambers and exhaust nozzles, turbine blades, stator blades, lens fusion blocks, and the like. They are also suitable for the fabrication of laboratory ware, including combustion boats, crucibles, burner holders, and other shapes. The bodies of the present invention are also highly useful as catalysts or catalyst carriers and supports. Materials and articles of the present invention can also be used for making abrasive articles such as grinding wheels, sharpening stones, razor hones, and other grinding and polishing shapes and materials. The present bodies offer possible applications in the electrical and radio industry including supports in electric light bulbs, radio tubes, X-ray tubes and radar equipment, resistors and grid leaks.

Having described the present invention it is desired to claim:

1. As a new article of manufacture, a body consisting essentially of granular metal carbide selected from the group consisting of titanium carbide, tungsten carbide, zirconium carbide, chromium carbide, molybdenum carbide, columbium carbide, hafnium carbide, tantalum carbide, thorium carbide, and mixtures thereof and homogeneously distributed throughout a continuous interstitial matrix of boron nitride, said body having been made by hot-pressing an intimate mixture of finely divided boron nitride and refractory metal carbide at a temperature of 1500° C. to 2000° C. and a pressure of at least 250 p.s.i.

2. As a new article of manufacture, a body consisting essentially of boron nitride and refractory metal carbide of one of the metals of the 4th, 5th, and 6th Groups of Mendeleeff's Periodic Table, at least 50% by volume boron nitride being present in said body, said body having been made by hot-pressing an intimate mixture of finely divided boron nitride and refractory metal carbide at a temperature of 1500° C. to 2000° C. and a pressure of at least 250 p.s.i.

3. As a new article of manufacture, a body consisting essentially of boron nitride and titanium carbide, at least 50% by volume boron nitride being present in said body, said body having been made by hot-pressing an intimate mixture of finely divided boron nitride and refractory metal carbide at a temperature of 1500° C. to 2000° C. and a pressure of at least 250 p.s.i.

4. As a new article of manufacture, a body consisting essentially of boron nitride and tungsten carbide, at least 50% by volume boron nitride being present in said body, said body having been made by hot-pressing an intimate mixture of finely divided boron nitride and refractory metal carbide at a temperature of 1500° C. to 2000° C. and a pressure of at least 250 p.s.i.

5. As a new article of manufacture, a body consisting essentially of boron nitride and refractory metal carbide of one of the metals of the 4th, 5th, and 6th Groups of Mendeleeff's Periodic Table, at least 60% by volume boron nitride being present in said body, said body having been made by hot-pressing an intimate mixture of finely divided boron nitride and refractory metal carbide at a temperature of 1500° C. to 2000° C. and a pressure of at least 250 p.s.i.

6. As a new article of manufacture, a body composed of a minor amount by volume of refractory metal carbide of one of the metals of the 4th, 5th, and 6th Groups of Mendeleeff's Periodic Table held together by a continuous interstitial matrix of boron nitride, said boron nitride constituting the major amount of the body by volume, said body having been made by hot-pressing an intimate mixture of finely divided boron nitride and refractory metal carbide at a temperature of 1500° C. to 2000° C. and a pressure of at least 250 p.s.i.

7. A method of making shaped articles of manufacture which comprises preparing a mixture consisting essentially of a major amount by volume of boron nitride and a minor amount by volume of refractory metal carbide of one of the metals of the 4th, 5th, and 6th Groups of Mendeleeff's Periodic Table, placing the mixture in a mold and hot pressing such mixture at a temperature of 1500° C. to 2000° C. and a pressure of at least 250 p.s.i.

8. A method of making shaped articles of manufacture which comprises preparing an intimately commingled mixture consisting essentially of finely divided boron nitride and finely divided refractory metal carbide selected from the group consisting of the carbides of titanium, tungsten, zirconium, chromium, molybdenum, columbium, hafnium, tantalum, thorium, and mixtures thereof, said mixture containing at least 50% by volume of boron nitride, placing the mixture in a mold and heating the mold and contents under pressure to a temperature of 1500° C. to 2000° C. and a pressure of at least 250 p.s.i.

References Cited in the file of this patent

UNITED STATES PATENTS 1,991,204  Grenagle _____ Feb. 12, 1935

FOREIGN PATENTS 478,016  Great Britain _____ 1938

UNITED STATES PATENT OFFICE
CERTIFICATE OF CORRECTION

Patent No. 2,888,355            May 26, 1959

Kenneth M. Taylor

It is hereby certified that error appears in the above numbered patent requiring correction and that the said Letters Patent should read as corrected below.

Column 2, line 49, for "2,789,886" read -- 2,808,314 --; line 62, for "300° C." read -- 300° F. --; column 3, line 9, for "now Patent No. 2,808,314" read -- abandoned and replaced by U. S. patent application Serial No. 700,750, now Patent No. 3,058,809 --.

Signed and sealed this 19th day of February 1963.

(SEAL)
Attest:

ESTON G. JOHNSON
Attesting Officer

DAVID L. LADD
Commissioner of Patents